United States Patent [19]
Van Driel

[11] Patent Number: 5,488,617
[45] Date of Patent: Jan. 30, 1996

[54] DATA PROCESSOR SYSTEM BASED ON AN (N, K) SYMBOL CODE HAVING SYMBOL ERROR CORRECTIBILITY AND PLURAL ERROR MENDABILITY

[75] Inventor: Carel-Jan L. Van Driel, Eindhoven, Netherlands

[73] Assignee: U.S. Philips Corporation, New York, N.Y.

[21] Appl. No.: 304,647

[22] Filed: Sep. 12, 1994

Related U.S. Application Data

[63] Continuation of Ser. No. 777,056, Oct. 16, 1991, abandoned.

[30] Foreign Application Priority Data

Oct. 16, 1990 [EP] European Pat. Off. ............. 90202747

[51] Int. Cl.$^6$ ............................ G06F 11/10; H03M 13/00
[52] U.S. Cl. ........................ 371/37.1; 371/37.2; 371/37.4; 371/37.6; 371/37.7; 364/265.2; 395/375; 395/800
[58] Field of Search ................................. 371/37.1, 22, 3, 371/4, 5.4, 7, 10.1, 11.3, 16.1, 16.5, 21.1, 21.5, 34, 37.2–37.7; 395/575; 364/265.2

[56] References Cited

U.S. PATENT DOCUMENTS

| | | | |
|---|---|---|---|
| 3,452,328 | 6/1969 | Mu-Yue Hsiao et al. | 340/146.1 |
| 3,601,800 | 8/1971 | Hua-Tung Lee | 340/146.1 |
| 4,030,074 | 6/1977 | Giorcelli | 364/200 |
| 4,105,999 | 8/1978 | Nakamura | 371/37.1 |
| 4,283,787 | 8/1981 | Chambers | 371/38.1 |
| 4,402,045 | 8/1983 | Krol | 364/200 |
| 4,413,339 | 11/1983 | Riggle et al. | 371/38 |
| 4,476,562 | 10/1984 | Sako et al. | 371/39.1 |
| 4,512,020 | 4/1985 | Krol et al. | 371/37.1 |
| 4,593,393 | 6/1986 | Mead et al. | 371/37.1 |
| 4,633,472 | 12/1986 | Krol | 371/40.1 |
| 4,882,731 | 11/1989 | Van Gils | 371/37.6 |
| 4,949,200 | 8/1990 | Weng | 360/72.2 |
| 5,107,506 | 4/1992 | Weng et al. | 371/39.1 |
| 5,132,975 | 7/1992 | Avaneas | 371/37.6 |
| 5,224,106 | 6/1993 | Weng | 371/37.4 |
| 5,291,496 | 3/1994 | Andaleon et al. | 371/3 |

FOREIGN PATENT DOCUMENTS 0440166  8/1991  European Pat. Off. .

*Primary Examiner*—Robert W. Beausoliel, Jr.
*Assistant Examiner*—Dieu-Minh Le
*Attorney, Agent, or Firm*—David Schreiber

[57] ABSTRACT

A data processing system based on (n, k) symbol code having symbol error correctability and plural error mendability is provided. The data processing system includes a decoder stage, a processor stage fed by the decoder stage, an encoding stage for receiving data words from the processor stage, a memory stage for receiving code words from the processor stage and a feedback stage for retro-coupling code words to the decoder stage. The data processing system includes at least two data processing units, each unit including more than one but less than n different encoder modules.

7 Claims, 4 Drawing Sheets

DATA PROCESSOR SYSTEM BASED ON AN (N, K) SYMBOL CODE HAVING SYMBOL ERROR CORRECTIBILITY AND PLURAL ERROR MENDABILITY

This is a continuation of application Ser. No. 07/777,056, filed Oct. 16, 1991, now abandoned.

BACKGROUND TO THE INVENTION

The invention relates to a data processing system based on a 100% redundancy four-symbol code-word code having both single-symbol error correctability and plural error mendability with respect to at least two symbols in one code word coexistently, said system having:
   a. a decoder stage having an input for receiving code words and to therefrom deriving two-symbol data words;
   b. a processor stage fed by said decoder stage to process said data words for therefrom developing memory addresses and further data words;
   c. an encoding stage having multiple encoder modules for receiving intendedly identical versions of a selection of said data words and for in respective encoder modules encoding unto respective different code symbols:
   d. a memory stage having multiple memory modules each fed by a respective one of said encoder modules for under control of said memory addresses collectively writing and reading all code symbols of an associated code word;
   e. feedback means fed by said memory modules for retrocoupling any code word so read to said decoder stage. U.S. Pat. No. 4,512,020 (PHN 10155, code 81), especially FIG. 24 thereof describes a four-module system that allows one module to completely fail without rendering the overall system inoperative. Symbols of a code word have a uniform length of a plurality of bits, in the reference of four bits. Correctible means that an arbitrary disturbance can be determined quantitatively and thereupon restored. So, both the questions as "where" the disturbance occurs and "what" the disturbance is, are answered. On the level of a single bit these two notions are identical. On the level of a plural-bit symbol, pointing the disturbed symbol is only the first step in realizing the correction. On the other hand, mendable is understood to mean that the effect of an error can be made inconsequential. In addition to full correction, this includes the possibility for declaring one or more particular symbols invalid or "erased" so that they would have no bearing for retrieving the code word's data content. Of course, such erasure renders the remainder of the code word less robust against further disturbances. On a higher level, mendability may on the level of the code proper also be restricted to detecting-only of the error. Then, the measures effectively taken could be a retry of the operation that would make a soft error presumedly invisible, a recourse to a higher-level authority such as a background memory, or just the being on one's guard as to the incorrectness encountered.

SUMMARY OF THE INVENTION

The above-referred (4,2) code conventionally has been mapped on a 4-module system, so that any symbol error corresponds to a module error and vice versa. The hardware has become attractive for use in such secure systems as telephone exchange controls. Now, it is among other things an object of the present invention to use the modular hardware, devised for the above (4,2) system and comparable systems, for other configurations wherein the direct correspondence between module and symbol has been given up while, either in an extended system, or in a more limited configuration, still realizing excellent cost vs effectivity results. An additional advantage of using standard hardware would be that development costs are now shared amongst a larger number of copies of such hardware, thereby effectively lowering the overall price tag.

According to one of its aspects, the invention provides a data processing system according to the preamble, and characterized in that said data processing system comprises at least one data processing unit wherein any said unit has more than one but less than four different active encoder modules, fed in parallel by its local processor module for collectively processing one single of said versions, for in respective memory modules of the data processing unit storing respective disjunct symbols of the data word version developed in the latter data processing unit.

Breakdown or malfunctioning of a single data processing module may now have more serious effects than according to the state of the art. On the other hand, the invention's robustness against malfunction on the code symbol level compares with the state of the art, while offering appreciable configuration flexibility, as explained infra.

Now, whereas the above deals with an (n,k)=(4,2) code, similar considerations apply to other codes, such as, in particular, but not limited to (6,4), (8,4) and (8,5) codes. These codes, due to a greater number of symbols per word, either would have a greater degree of protection, or a higher efficiency (=lower fractional redundancy) or allow for shorter symbols (divide the data bits among a greater number of individual symbols) or any advantageous mixture thereof, such as the skilled art worker would readily recognize. Nevertheless, the same advantages as regards the (4, 2) code would be realized. The skilled art worker recognize maximum values of n, k as dependent on the symbol's bit length. In consequence, according to an even broader aspect of the invention, it provides a data processing system based on a code having n-symbol code words at a k-symbol information content per code word, wherein $n-k \geq 2$ and $k \geq 2$ and having at least single-symbol error correctibility and plural error mendability with respect to at least two symbols in one code word coexistently, said system having:
   a. a decoder stage having an input for receiving code words and to therefrom deriving k-symbol data words;
   b. a processor stage fed by said decoder stage to process any word received for therefrom developing memory addresses and further data words;
   c. an encoding stage having multiple encoder modules for receiving intendedly identical versions of each of a selection of said further data words for in respective encoder modules encoding unto respective different code symbols of the associated code word;
   d. a memory stage having multiple memory modules each fed by a respective one of said encoder modules for under control of an associated one of said memory addresses collectively writing and reading all code words of said associated code word;
   e. feedback means fed by said memory modules for retrocoupling any code word so read to said decoder stage, characterized in that said data processing system comprises at least two data processing units wherein any said unit has more than one but less than n different encoder modules, fed in parallel by its local processor module for collectively processing one single of said versions, for in respective memory modules of the data processing unit storing respective disjunct symbols of the data word version developed in the latter data processing unit.

By itself, multi-encoder modules have been described in U.S. Pat. No. 4,633,472 (PHN 10.474). There, in a standard 4,2 system according to the first-cited art, each unit has a standard encoder module to generate a code symbol from the data word produced locally for subsequent storage in a standard local memory module. Moreover, specifically for I/O purposes, a second memory module is present that is provided with a second encoder module and complementary decoder module. However, the so-encoded symbols are used for storage in the second memory module, and are not used in combination with code symbols read out from the first memory module, for collective decoding thereof. So, this particular reference has the two encoder modules operating mutually asynchronously on the data word level. According to the present invention, the plural encoder modules do not represent alternative possibilities for respective alternate functionalities, but function as based on a unitary data word content, that is, either on a single data word, or on two (or more) data words that should in theory or intendedly be identical. When using the (4, 2) code, at least on the level of the data processing unit, the error mending capability is inferior to that of a full (4,2) system.

According to a further aspect of the invention, it provides a data processing system having a single processing unit that has three different encoder modules for so storing a 50% redundant code word at an error protection capability at least equal to that of an (12,8,3) Hamming code. As explained hereinafter, flexible mendability is substantially improved in this way, with respect to the (12,8,3) Hamming code, that has the same redundancy.

According to a still further aspect of the invention, it provides a data processing system having two processing units that each have two unique encoder modules each feeding an associated memory module for having said system so storing a 100% redundant code word for rendering correctable any double bit error pattern, for under presence of a first erased symbol rendering detectible any error in a second symbol error, or alternatively rendering correctable any single bit error in such second symbol, and for rendering retrievable from any two code symbols the associated data word. In this way, on the symbol level the same protection is produced as that of a (4,2) system; on a unit level, the protection is less, which is mitigated by decreased processor costs.

According to a still further aspect of the invention, it provides a data processing system having four processing units that each have two encoder modules that are unique among the odd or among the even processing units, respectively, each feeding an associated memory module for in said system storing two parallel versions of said 100% redundant code word, each such code word deriving one respective code symbol from each one of said processing units and being backfeedable to any of said processing units, so that upon any single-unit disability still any code word is flawlessly stored in the collective memory modules. In this way, a fourfold system is realized, that moreover, has extensively improved error protection with respect to the quasi fourfold (4,2) system.

According to a still further aspect of the invention it provides an application of the (4,2) system in that it provides a system wherein said data processing system comprises three data processing units that each have one unique encoder module, fed in parallel by its local processor module for collectively producing three code symbols as based upon a 50% emulated data word version, any processing unit having a decoder module for receiving three code symbols in parallel while also receiving a dummy code word symbol and outputting a dummy data word symbol. Through use of dummy symbols, in this way an elementary (3,1) system is realized as based on the same hardware as the (4,2) standard system, with about as good an error protection capability as the best (3,1) systems that are considered feasible.

In addition to the various representations described herein that are founded on the (4,2) system, similar versions could be built with respect to other (n,k) systems that have $n-k \geq 2$, $k>2$ or $n>4$, and in addition to the straight symbol correctability (such as by Reed-Solomon codes) other, extended error correction capability, due to their additional error protection on the bit-non-symbol level. Effectively, this additional error protection is realizeable in that the symbol number is relatively small with respect to the number that could be used for the actual symbol length counted in bits. For example, a (6, 4) code could be used as one unit having five encoder modules, or as three units each having two encoder modules, or as six units each having two encoder modules. An (8, 4) code could be used as one unit having six or seven encoder modules, or two units each having four encoder modules, or four units each having two encoder modules. The (6, 4) code, by comparison with FIG. 5, infra, could have five units each with one encoder module and three dummy symbols. The (8, 4) code could have seven units each with one encoder module and three dummy symbols. Many other realizations would become apparent to the worker in (n, k) system technology. Generally, an (n, k) code can be used to build various (m, I) systems, wherein $l<m<n$ and $1 \leq I \leq k$.

BRIEF DESCRIPTION OF THE FIGURES

The invention will hereinafter be explained in detail in and by the appended Figures that show various preferred embodiments, wherein.

DESCRIPTION OF PREFERRED EMBODIMENTS

In computer systems, error correcting codes are often used to improve the reliability. An example is the use of the Hamming code to correct single bit errors in the data received from memory.

However a general approach is the (n,k)-concept computer. This approach gives the opportunity to choose the ratio between processor redundancy and memory redundancy. This means that the reliability versus costs can be optimized by choosing the appropriate values for n and k.

For instance if the values n=3 and k=1 are chosen a TMR (Three Module Redundancy) system is obtained. In this case all hardware is tripled. If the values n=4 and k=2 are chosen a (4,2)-concept system is obtained. In this case the processor logic is fourfold and the memory is only doubled. The most expensive part of the system is often the memory. Therefore the costs of a (4,2)-concept computer can be lower than the costs of a (3,1)-concept computer.

In an (n,k)-concept computer an error correcting/detecting code is used. This code is called the (n,k)-code. For the traditional TMR system a replication code is used. This code is not optimal. For the (4,2)-concept the (4,2) code is used. The (4,2)-concept as well as the properties of the (4,2) code have been published, see the first-mentioned reference.

The (4,2) code can also be used efficiently in other systems. The (4,2) code is used generally hereinafter. It is shown that a (4,2) code can be used instead of a Hamming code in a single unit system. Also, the advantages of the (4,2) code in a (2,1)-concept (doubled) system are discussed. It is shown that the (4,2) code can also be used in a (3,1)-concept computer. A short discussion on the use of the (4,2)-concept computer is presented.

The method described herein can be generalized to the use of the combination of an (n,k)-code and (m,l)-concept system, if $1 \leq m \leq n$ and $1 \leq l \leq k$. However depending on the values of n,k,m and l different characteristics show up. An example illustrates the method.

Figure 1:
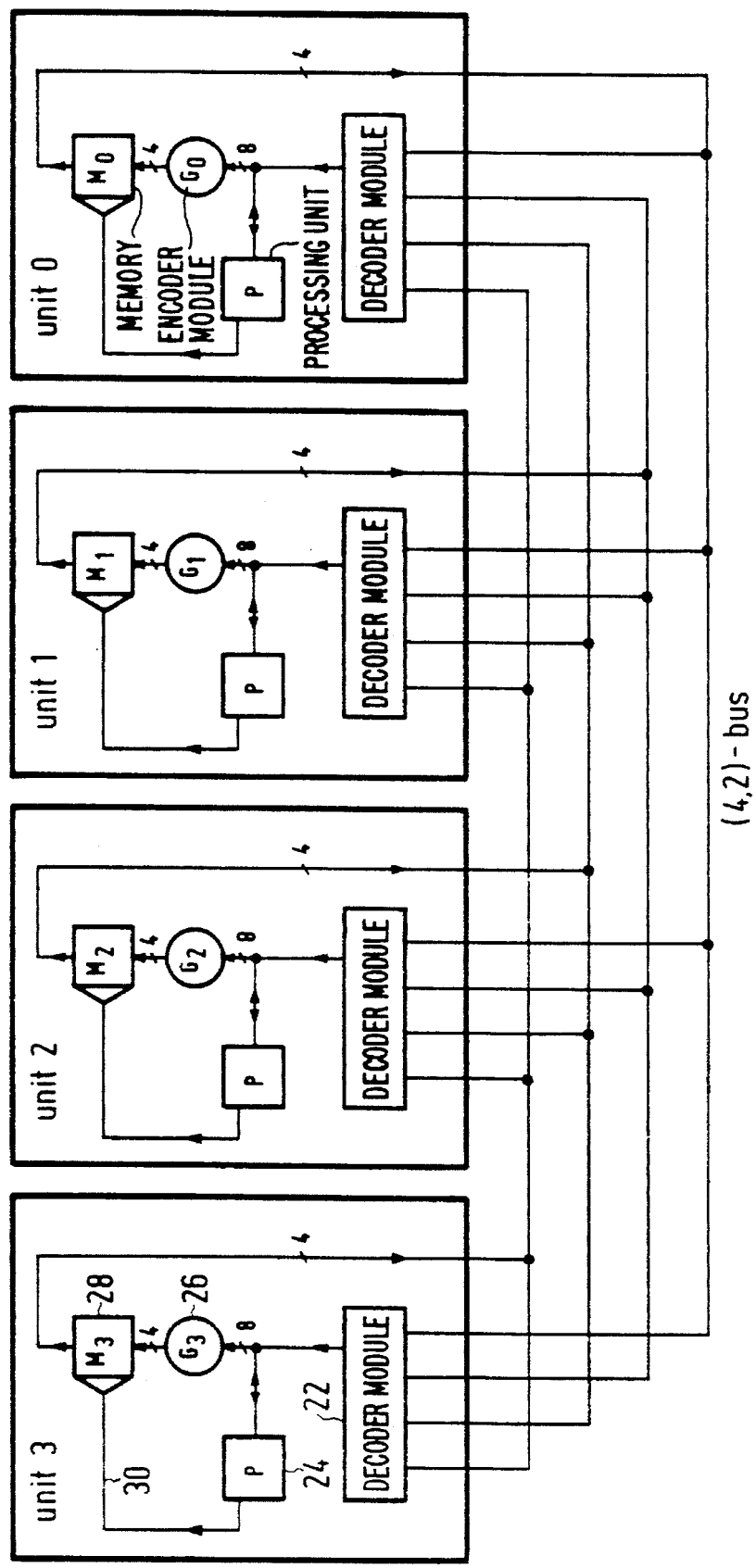
FIG. 1 shows a conventional (4,2) system.

In the following, first a short description of a (4,2)-concept computer for four-bit symbols is presented. Hereafter an overview of the properties of the (4,2) code is given. The (4,2)-concept computer consits of four units (see FIG. 1). Each unit, such as 20, comprises a chain of a four symbol in, two symbol out decoder module 22, a processor module 24, an encoder module 26 and a memory module 28. The data input of the memory module is fed by the encoder module. The address input 30 need not be fed by the encoder module as this would only represent shuffling among the memory addresses, and, moreover, would diminish the available address range. For brevity, no control paths and no mutual synchronization among the four units have been shown. The assumption made in an (n,k)-concept computer is that the n modules are designed to run synchronous and deterministic. In the following only the processor/memory communication is discussed. The connection with external systems is not discussed.

During a write each processor writes its data through the encoder into the memory. The encoders differ in each module which has been indicated by their different labeling G0, G1, G2, G3, respectively. In this way the 8 bits of information are encoded in a 16 bit code word. However each unit only stores 4 bits (a code symbol) of this code word. When the processors read the information back from the memory the four symbols are received in each unit by the decoder. The decoder will generate the original information for the processor in each unit if the amount of errors does not exceed a certain maximum. In practice, however, each unit could have identical hardware for in effect realizing all four different encoder modules, inasmuch as this would only represent a slight addition to the silicon area, which could be more than outweighted by the advantage of a fourfold increase in the number of mutually identically circuits (=units) that were to be manufactured.

The amount of errors that can be corrected is given by the properties of the (4,2) code. In the following the most important properties of the (4,2) code are listed. Next, these properties will determine how the (4,2) code may be used in other systems. Now, these properties, for four-bit symbols, are as follows:

1. correction of any arbitrary single-symbol error;
2. correction of any double-bit error pattern;
3. if one symbol is erased another symbol error can be detected;
4. if one symbol is erased a single-bit error can be corrected;
5. from any two symbols the original information can be retrieved;
6. two symbols are the original information symbols.

Property 3 follows from the observation that the minimum symbol weight of a code word (=number of non-zero code symbols) with one erased symbol is equal to 2.

THE USE OF THE (4,2) CODE IN A SINGLE-UNIT SYSTEM

Figure 2:
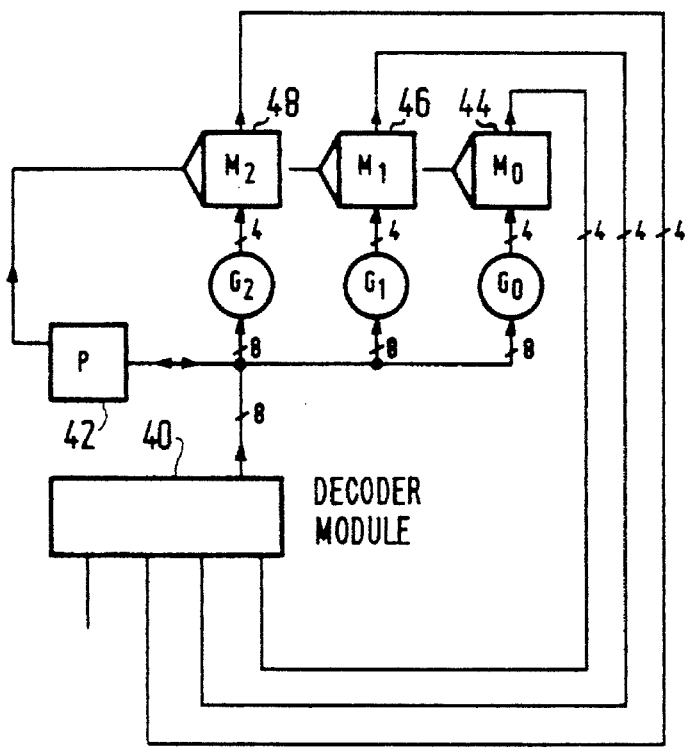
FIG. 2 shows the use of the (4,2) code in a single-unit system.

The (4,2) code can be used in a single-unit system as a replacement of a (12,8,3) Hamming code. The system according to the invention is shown in FIG. 2, which has a four-symbol decoder 40 (of which one symbol input is not used), a processor module 42, three different encoder modules G0, G1, G2 each feeding an associated memory module 44, 46, 48. These are again addressed by processor module 42. With respect to the Hamming code system, no extra costs are involved: the amount or memory is the same. However the (4,2) code implementation offers more. In the following a short explanation of the implementation of a (4,2) code in a single system is given.

During a write the 8 bit information word is encoded in three different ways by the encoders G0, G1 and G2. This results in three 4-bit code symbols. Each of them is written into an associated memory module. Generally, within the unit, the various memory modules may be part of (a bank or block of) a larger memory unit. During a read cycle the three code symbols are received by the decoder. The decoder is in an erasure mode. It erases the fourth symbol that had not been stored in memory. The decoder decodes the 12-bit code word into an 8-bit information word that is offered to the processor.

The following error detection/correction capabilities are available in this way:

single bit error correction or, single symbol error detection.

The single bit error correction follows from property 4. With a Hamming code exactly the same result would have been obtained so far. However if a bit error appears to be a hard error it is easy to switch the decoder in single mode so that only two 4-bit symbols determine the output of the decoder. In this way only 8 bits determine the output of the decoder instead of 12 bits of which one is faulty. So the probability that the output is erroneous due to another bit error is reduced to 8/11 of the original probability.

The fact that the symbol weight of a code word with one erased symbol is at least two, leads to the conclusion that it is also possible to detect single symbol errors (property 3). This can be useful if the memory is designed as memory banks of 4 bits width each. The failure of such a bank can be detected.

The solution with the (4,2) code is flexible in the sense that the designer/user of the system can maximize the reliability of the system by chosing the proper method. Note that this entirely depends on the strategy. The hardware is exactly the same.

THE USE OF THE (4,2)-CODE IN THE (2,1)-CONCEPT

Figure 3:
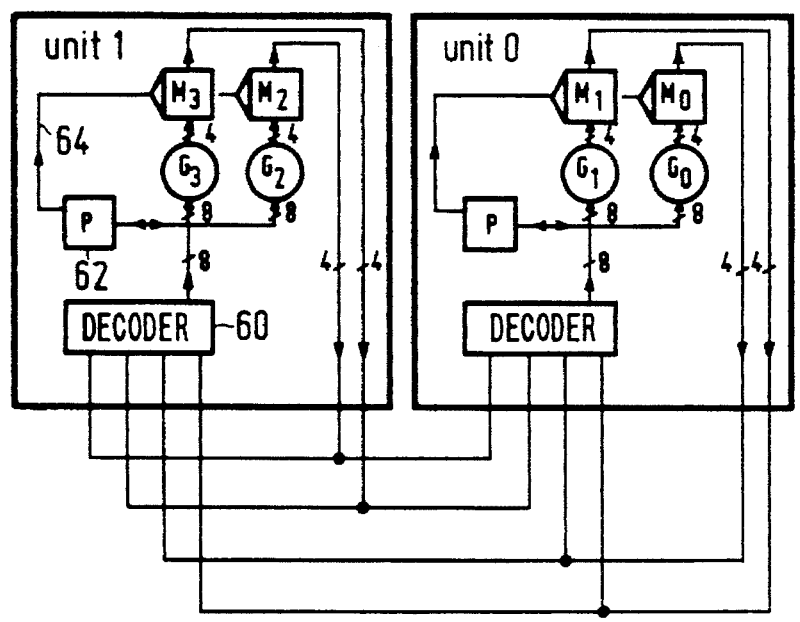
FIG. 3 shows the use of the (4,2) code in a two-unit system.

FIG. 3 shows how a (4,2) code can advantageously be used in a doubled system. The left hand unit has decoder module 60, processor module 62, address bus 64, encoder modules G3,G2 feeding memory modules M3,M2, respectively. The right hand unit is structurally identical, except for encoder modules G1,G0, that feed memory modules M1,M0, respectively. Of course, all memory modules may be structurally identical. Now, the same encoders and decoders are used in the doubled system as in the (4,2)-concept computer. Only the error control differs, since the same type of error will not result in the same action. The advantage of the (4,2) code used in a doubled system is that the designer or user can adapt its fault-handling mechanism depending on the relation between the type of error and the type of fault or system degradability. An alternative for the (4,2) code is a (2,1)-code. However the (4,2) code is optimal because it is used as a (2,1)-code. In the remainder of this section the architecture of a doubled system with a (4,2) code is explained first. Hereafter the flexibility of the fault-handling mechanism is illustrated with some examples.

The (4,2) code consists of 4 code symbols. From any pair of code symbols the original information can be retrieved (property 5). The doubled system consists of two units. Each unit has two encoder modules in order to encode the information symbols into two code symbols during a write cycle of the processor. Each unit writes two different code symbols into its memory. The four code symbols form a code word. One pair of code symbols is written into the memory of unit 0, the other pair into the memory of unit 1.

During a read cycle of the processor the four code symbols are latched at the input of the decoder. If no error has occurred both processor modules receive the same correct information. However if an error has occurred, the decoder will detect and, if possible, correct it. In the following, three examples are discussed concerning the consequences of the detection of an error.

After the detection of an error, one of the possibilities is to do exactly the same as in a traditional doubled system. As soon as an error occurs, stop processing and try to locate the fault with a diagnostic program. This is the basic procedure for doubled systems. The (4,2) code offers more flexibility as shown in the following (see also the Table at the end of this section).

In a traditional doubled system one often uses a Hamming code to correct single bit errors in memory. This will increase the cost of the memory by 25%–50%, depending on the word length. For 8-bit words, it is 50%. Since the memory is the most expensive part of the system this will have a great influence on the total cost. In the system proposed here, it is possible to use a Hamming code for single-bit error correction, but it is not necessary to do so. In effect, the single bit error correction is available (without any memory increase) also in the system proposed here.

The (4,2) code can correct single and double bit errors. So it is possible to use (part of) the correction capability in the double system. However one must be aware of the fact that using (part of) the correction capability also implies that the probability of miscorrection/misdetecttion increases. E.g. if a unit fails it might generate two erroneous symbols so that the decoders will correct a single bit error while the system should be stopped. A double symbol error would have been detected if the single bit error correction had not been used.

Three basic elements determine the reliability of the doubled system:
the coverage factor of the diagnostic program,
the reliability of the memory with respect to both hard and soft bit errors as well as chip failures, and
the reliability of the processor logic.

Using the (4,2) code in a doubled system gives the opportunity to optimize the reliability of the doubled system without using cost increasing methods. Eventually the costs will be lower if one decides not to use the Hamming code.

TABLE

| error | result (example 1) | result (example 2) |
|---|---|---|
| single bit error | correction | correction |
| double bit error | stop normal execution; start diagnostic program | correction |
| symbol error | stop normal execution; start diagnostic program | correction |
| uncorrectable error | stop normal execution; start diagnostic program | stop normal execution; start diagnostic program |

QUADED MODULAR REDUNDANCY SYSTEMS

Figure 4:
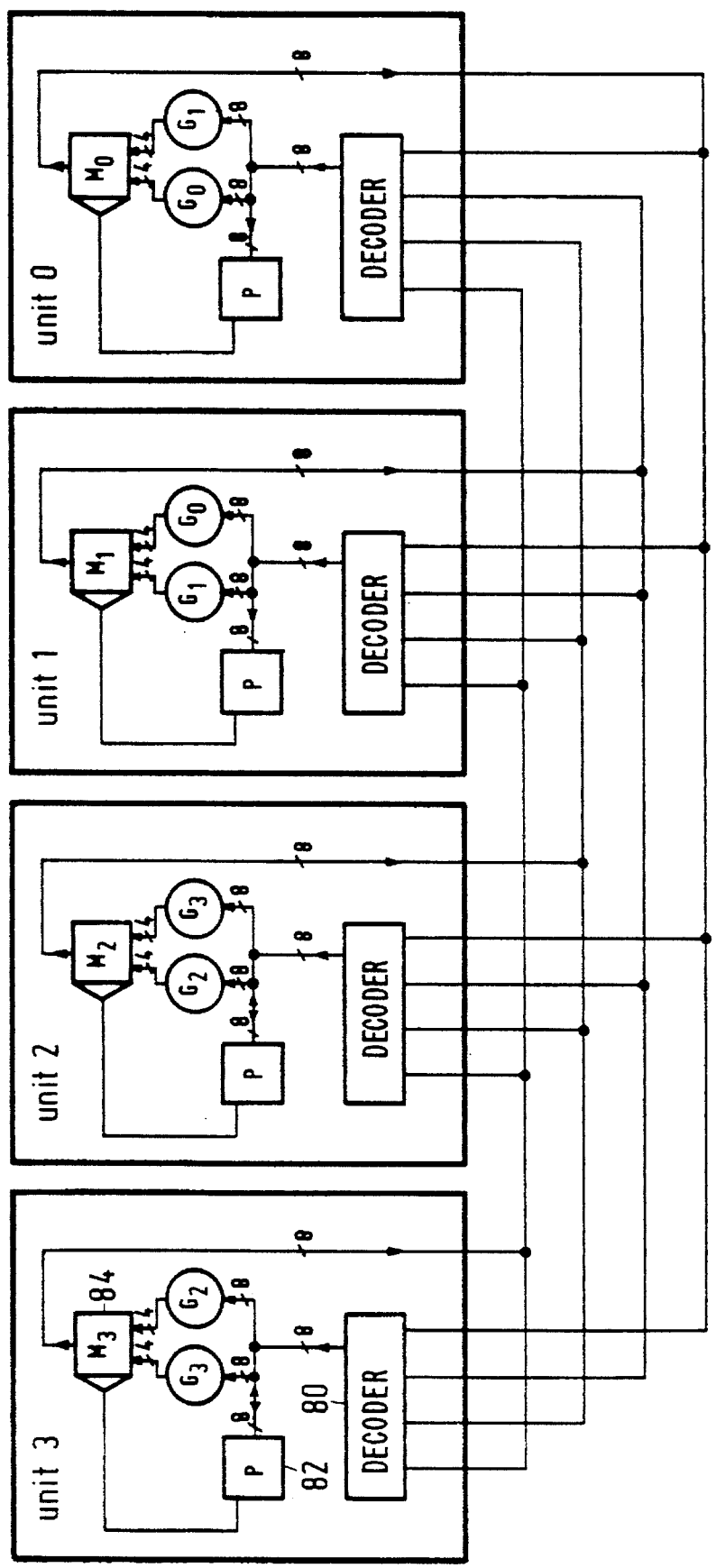
FIG. 4 shows the use of the (4,2) code in a (4,1) system.

FIG. 4 shows a quaded modular redundancy system that consists of four units. The left-hand unit has two sixteen-bit decoder modules in parallel, each receiving a 16-bit code word for translation into an eight bit, two symbol data word. Of course, the two decoder modules may be mapped on a single decoder hardware 80 that in alternation were operative on the two, intentionally identical, code words. The two data words, so generated, are of course intended to be identical. The two data words are processed in processor module 82 which may either be two identical 8-bit processor modules in parallel, or a single processor module of 8-bits wide alternatingly emulating the first, and the second 8-bit processor, supra. Next, the processing result, if a memory module address, addresses its associated memory module 84 of a combined width of 8 bits. In the Figure, this has been depicted as a single block. Physically, it could be realized as two separately activable memory banks or as a single one. If the processing result is data, module G3, G2 come into play. If the data word so generated is an odd data word, it is presented to encoder module G3. If the data word is an even data word, it is presented to encoder module G2. The second processing unit is identical to the first processing unit, except that "odd" and "even" have been interchanged, which is represented by encoder modules G3,G2 having exchanged their positions. The third and fourth processing units from the left are identical to the earlier two, except for the encoder modules G1,G0 now figuring. The additional logic necessary for effecting the foregoing and the strategy, infra, has not been shown for brevity. The system so described can have the attribution of the symbols to the respective modules summarized according to:
3,2/2,3/1,0/0,1.
A slightly different attribution would be as follows:
0,3/3,2/2,1/1,0.
The two schemes each have their specific advantages: the second one, at two units failing, could still dispose of three different code symbols, regardless of the failure pattern. Hereinafter, the first scheme is considered.

Now, in general, systems with a fourfold of processor and control logic can be developed without using a fourfold of memory. The standard (4,2)-concept computer, for instance, only has a doubled amount of memory. The (4,2) code can also be used in quaded systems with a fourfold of memory ((4,1)-concept systems). In the following, first the differences between the (4,2)-concept computer and a fourfold system are explained. Hereafter a discussion on the (dis)advantages of the use of a (4,2) code in a (4,1)-concept system is presented.

The major differences between the (4,2)-concept computer and a fourfold system are:

costs and, degradation capabilities.

The costs of a fourfold system are four times as high as the costs of a single-unit system. The cost of a (4,2)-concept computer is between 2 and 3 times as much as the cost of a single-unit system due to the fact that memory is the most expensive part. The (4,2)-concept computer tolerates one failing unit and then switches to a system with three working units. Now, no further failing unit can be tolerated, unless the failing unit is known.

The fourfold system can tolerate one failing unit and thereupon switches to a threefold system. As a threefold system it can tolerate another failing unit, except when the latter's messages to the other units are inconsistent, in that the other units would disagree on the information actually received. If only two working units are left, the system can operate as a doubled (fail-safe) system. So the fourfold system will be more reliable than the (4,2)-concept system but also more expensive (up to a factor two). The way the (4,2) code can be used is not by duplication of a code symbol in each unit. One of the ways the symbols of two different encoders are mapped on a unit is shown in FIG. 4.

However the degradation of a fourfold system, via a TMR system, to a doubled system is a complex process as shown hereafter. Each decoder module in a unit can correct a single symbol error. So one unit may fail. Then, two codewords, each consisting of three symbols, are left. If no communication between decoder modules in different units is possible, no further failing unit can be tolerated. However, two code symbols from one unit always represent the original information. The 6 code symbols of the two code words always have at least symbol weight 4, which means that a single symbol error can always be corrected and a second one can always be detected. So by combining the 6 code symbols, again one failing unit can be tolerated. If a unit fails this means that the system is degrading to doubled system.

So the use of the (4,2) code in a fourfold system leads again to a flexibility for the designer/user of the system. However the decoding scheme of the fourfold architecture is more complicated, especially if maximum correction/detection capability has to be obtained.

Now, the rearrangement of FIG. 4 may be changed by using the second attribution of the various encoder modules to the various units. For the situation of one failing unit and three failing units, the situation is identical to the first-mentioned organization. However, if two units fail, the system has always three different symbols available of which two in duplicate, from respective different units. This offers various possible strategies, depending on whether the duplicate symbols are identical or not, and in any way, some mendability of various bit errors, both in the duplicate symbols and outside.

All other combinations of encoder modules and processing units would reduce to a renumbering of the symbols only.

THE USE OF THE (4,2) CODE IN A THREE-UNIT SYSTEM

Figure 5:
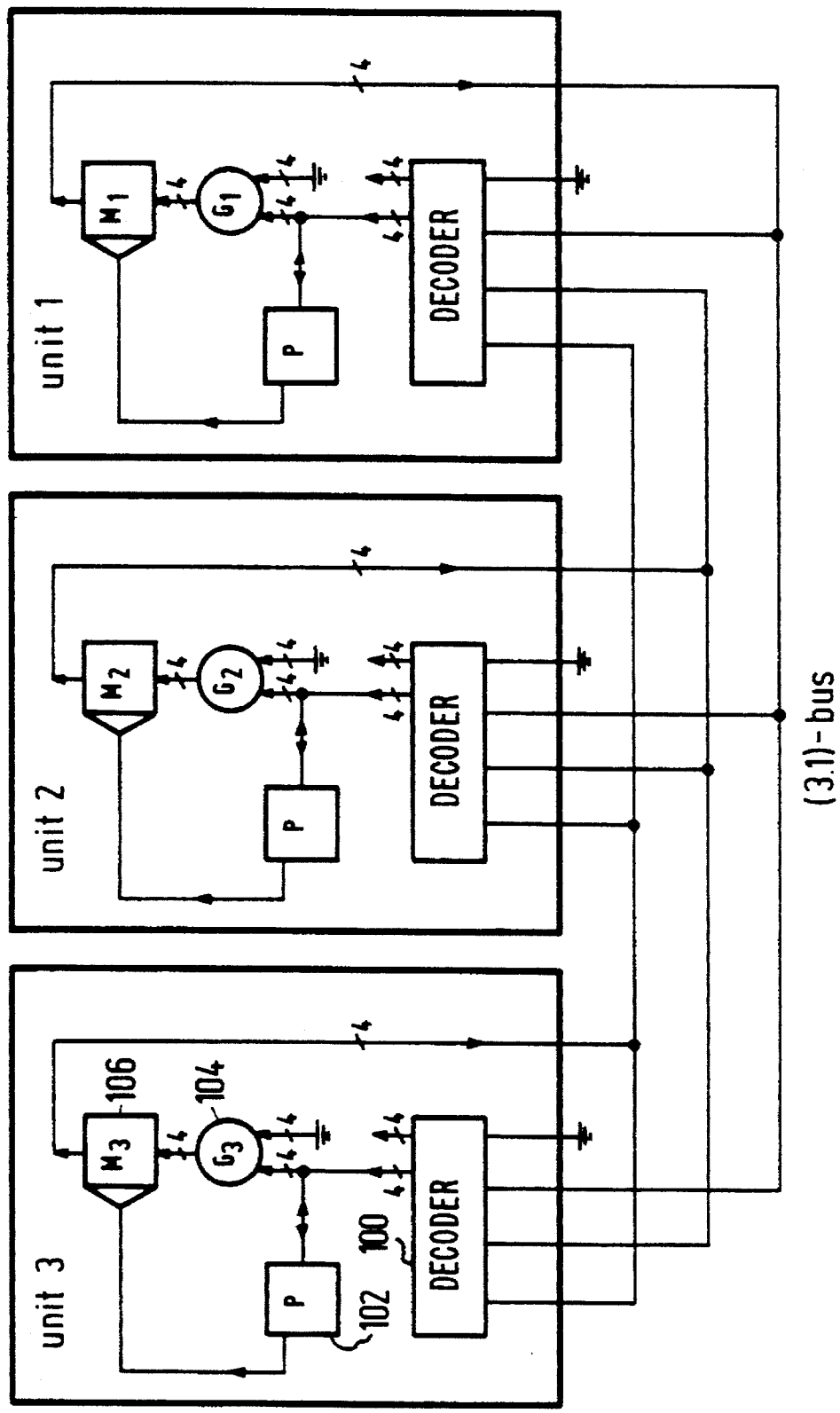
FIG. 5 shows the use of the (4,2) code in a three-unit system.

FIG. 5 shows the use of the (4,2) code in a three-unit system. The left-hand unit has standard decoder 100, processor 102, encoder module 104, and memory module 106. The two other units are identical, apart from the use of respective different encoder modules, G3, G2, G1 as shown. Now, although codes have been designed especially for triple modular redundancy systems (TMR), the (4,2) code is nearly optimal compared with the best (3,1) code.

Now, the basic approach to use a (4,2) code in a TMR system is to shorten the code. This can be implemented in the following way. To a 4-bit information word (nibble) a default nibble is added. In this way a byte (8 bits) is obtained. It consists of four bits of information and four bits (or dummy symbol) of which the value is a prior known. The nibble, of which the information is a priori known, is preferably the same in each of the three modules. For the example shown the default value is chosen or emulated to be zero. The byte is used as input for the encoder. The encoder modules generate a 4-bit code symbol which is stored into memory during a write cycle of the processor.

The (4,2) code word consists of four code symbols. Now, one of the code symbols is the 4-bit information nibble while another code symbol is the a priori known nibble (property 6). During a read the three code symbols are received by the decoders. Since the fourth symbol is a priori known also the fourth symbol is received by the decoder. Now the decoder has four code symbols of which one symbol can be corrected. This implies that one failing module can be tolerated. If all three modules are operational, two random bit errors can be corrected in the 16 bits of the code word. Note that the value of one symbol of the code word is always the same. So effecitvely two random bit errors can be corrected in a 12 bit code word.

Now suppose that a module fails and the decoders switch to erasure mode. Then the system degrades to a double system. Of the three non-erased symbols one is a priori known. Now any error can always be detected, because the symbol weight of the erased code word is at least two. So a doubled system is obtained. It is also possible to use a part of the redundancy for single bit error correction and the remaining part for symbol error detection. The designer/user of the system has the opportunity to maximize the reliability of the system in a similar way as discussed supra for FIG. 3.

SOME GENERAL CONSIDERATIONS

In the foregoing, the (4,2) code has been discussed with respect to 4-bit symbols and 1 . . . . 4 processor units. For longer symbols, the application would be similar, be it, that on a bit-error level the protection capability would be greater.

A. For a general (n,k) code, any number i of symbols may be erased, with i≦n−k. At a data word length of L, each encoder module would then generate a symbol length of L/k. This code could then be used in configurations according to FIGS. 2, 3, 4 be it with an adapted number of units. For example, the system of FIG. 1 could operate with any number of encoder modules k, k+1 . . . . n−1 each time with appropriate error correction features.

B. A further possibility is according to FIG. 5, that each unit, at the input of its decoder module, at the output thereof, as well as on the input of its encoder module, would treat i=1 . . . . . k−1 symbols as dummy symbols. As in FIG. 3, an advantageous value would be equal to zero. The total system would then need an appropriate number of units, in that the (n,k) code used were now reduced to an (n−i,k−i) system.

C. A still further solution, generally comparable to FIG. 4, would be to join i (i is a common factor of k,n) encoder modules in a unit and use only one processor module in the relevant unit.

D. A still further way, also comparable with FIG. 4 were to use i encoder modules in a shuffled way in any unit, which i is a factor of n, but not necessarily of k. This would transform the (n,k) code effecting to a (n,k/i) code.

In the case of a (4,2) code, these cases A, B, C, D would then lead, respectively:

(4,2)→A→(3,2)

(4,2)→B→(3,1)

(4,2)→C→(2,1)

(4,2)→D→(4,1)

A case of successive gracefull degradations, starting from an (8,5) code would then be realized as follows:

(8,5)→A→(7,5)→B→(6,4)→C→(3,2)→D→(3,1).

What is claimed is:

1. A data processing system based on a 100% redundancy four-symbol code word having both single-symbol error correctability and plural error mendability with respect to at least two symbols in one code word coexistently, said system having:

a. a decoder stage having an input for receiving said code word and to therefrom deriving two-symbol data words;

b. a processor stage fed by said decoder stage to process said data words for therefrom developing memory addresses and further data words;

c. an encoding stage having multiple encoder modules for receiving intendedly identical data word versions of a selection of said data words and fork in respective encoder modules, encoding unto respective different code symbols;

d. a memory stage having multiple memory modules each fed by a respective one of said encoder modules for, under control of said memory addresses, writing and reading all code symbols of an associated code word; and e. feedback means fed by said memory modules for retrocoupling any code word read to said decoder stage; wherein said data processing system comprises at least one data processing unit, wherein any said unit has more than one but less than four different active encoder modules fed in parallel by corresponding processing unit for collectively processing one single of said data version, for in respective memory modules of the data processing unit storing respective disjunct symbols of the data word version developed in said corresponding data processing unit.

2. A data processing system as claimed in claim 1 and having a single processing unit that has three different encoder modules for storing a 50% redundant code word at an error protection capability at least equal to that of an (12,8,3) Hamming code.

3. A data processing system as claimed in claim 1 and having two processing units that each have two unique encoder modules each feeding an associated memory module for having said data processing system that storing a 100% redundant code word for rendering correctable any double bit error pattern, for under presence of a first erased symbol rendering detectible any error in a second symbol error, or alternatively rendering correctable any single bit error in such second symbol, and for rendering retrievable from any two code symbols data word associated with said memory module.

4. A data processing system as claimed in claim 1, wherein said processing includes a first, a second, a third and a fourth processing unit, each processing unit having two encoder modules that are unique among the first and third processing units or among the second and fourth processing units, respectively, each feeding an associated memory module in said data processing system for storing two parallel versions of said 100% redundant code word, each such code word deriving one respective code symbol from each of one said processing units and being back-feedable to any of said processing units, so that upon any single-unit disability any code word is flawlessly stored in said memory module.

5. A data processing system as claimed in claim 4 and having operational capabilities under disablement of any number of up to three processing units.

6. A data processing system based on a 100% redundancy four-symbol code-word code having both single-symbol error correctability and plural error mendability with respect to at least two symbols in one code word coexistently, said system having:

a. a decoder stage having an input for receiving said code word and to therefrom deriving data words;

b. a processor stage fed by said decoder stage to process said data word for therefrom developing memory addresses and further data words;

c. an encoding stage having multiple encoder modules for receiving intendedly identical versions of a selection of said data words and for in respective encoder modules encoding unto respective different code symbols;

d. a memory stage having multiple memory modules each fed by a respective one of said encoder modules for under control of said memory addresses collectively writing and reading all code symbols of an associated code word;

e. feedback means fed by said memory modules for retrocoupling any code word so read to said decoder stage;

characterized in that said data processing system comprises three data processing units that each have one unique encoder module, fed in parallel by its local processor module for collectively producing three code symbols as based upon a 50% emulated data word version, any processing unit having a decoder module for receiving three code symbols in parallel while also receiving a dummy code word symbol and outputting a dummy data word symbol.

7. A data processing system based on a symbol-error correcting code based on (n,k) symbol code words, each code word representing a k-symbol data word, all symbols having a uniform multibit size, said data processing system comprising a plurality of parallel processing units for collectively producing a first set of code symbols pertaining to a single n-symbol code word, on an interconnection network, each processing unit comprising:

input means coupled to said interconnection network for receiving all code symbols of said first set of code symbols;

a decoder responsive to said input means for, from said first set of code symbols, reconstituting an n-symbol code word and decoding said n-symbol code word to a k-symbol data word, wherein n and k are integers;

a processor coupled to said decoder for executing processing operations on said data word that are independent from either encoding or decoding;

a plurality of less than n encoders mutually unique within said processing unit and coupled to said processor, each encoder encoding said k-symbol data word into a predetermined code symbol of a second set of code symbols; and a memory coupled to said encoders for storing said symbols encoded by said encoders;

each of said processors including output means coupled to said memory and said encoders for outputting said second set of code symbols to said interconnection networks said first set of code symbols and said second set of code symbols having equal sizes.

* * * * *